United States Patent [19]

Linder et al.

[11] Patent Number: 5,123,617

[45] Date of Patent: Jun. 23, 1992

[54] SPACECRAFT MOMENTUM UNLOADING USING CONTROLLED MAGNETIC TORQUES

[75] Inventors: David M. Linder, Buckingham Township, Bucks County, Pa.; Neil E. Goodzeit, East Windsor Township, Mercer County; Marc Schwarzschild, East Brunswick Township, Middlesex County, both of N.J.

[73] Assignee: General Electric Company, East Windsor, N.J.

[21] Appl. No.: 488,919

[22] Filed: Mar. 5, 1990

[51] Int. Cl.⁵ ............................................. B64G 1/10
[52] U.S. Cl. .................................................. 244/166
[58] Field of Search ............... 244/165, 166, 164, 169, 244/170, 171, 172; 364/434, 459

[56] References Cited

U.S. PATENT DOCUMENTS

| | | | |
|---|---|---|---|
| 3,429,524 | 2/1969 | Buckingham et al. | 244/1 |
| 3,681,583 | 8/1972 | Kubo et al. | 244/166 |
| 3,834,653 | 9/1974 | Perkel | 244/166 |
| 3,955,858 | 5/1976 | Poubeau | 244/166 |
| 4,010,921 | 3/1977 | Pistiner et al. | 244/166 |
| 4,062,509 | 12/1977 | Muhlfelder et al. | 244/166 |
| 4,071,211 | 1/1978 | Muhlfelder et al. | 244/165 |
| 4,916,622 | 6/1988 | Raman et al. | 244/166 |

Primary Examiner—Jesus D. Sotelo
Assistant Examiner—Stephen P. Avila
Attorney, Agent, or Firm—William H. Meise

[57] ABSTRACT

A method for maintaining the attitude of a three-axis controlled satellite by use of magnetic torquers includes using magnetometers for measuring the direction of the ambient geomagnetic field. The direction of the net reaction wheel momentum is also determined. The angle between the direction of the geomagnetic field and the net reaction wheel momentum is determined. The angle is compared with a threshold value. Magnetic torquer power consumption is reduced by operating the magnetic torquers only when the angle exceeds the threshold value.

5 Claims, 7 Drawing Sheets

SPACECRAFT MOMENTUM UNLOADING USING CONTROLLED MAGNETIC TORQUES

The invention described herein was made in the performance of work under NASA Contract No. NAS5-32000 and is subject to the provisions of Section 305 of the National Aeronautics and Space Act of 1958, as amended (72 STAT. 435; 42 U.S.C. 2457).

BACKGROUND OF THE INVENTION

This invention relates to attitude control of spacecraft, and more particularly to unloading of reaction or momentum wheel momentum by the use of controlled magnetic torquers.

Orbiting spacecraft are used for a large variety of sensing and communication purposes for photographic purposes, it is desirable for the spacecraft to be relatively near the Earth, so that the cameras or sensors are close to the subjects, and so that the spacecraft may cover large amounts of surface by virtue of a rapid orbital rate. For communication purposes, a geosynchronous equatorial orbit is often desirable. Whatever the orbit, the satellite must be stabilized in space if the sensors or antennas are to be pointed in appropriate direction.

Spacecraft attitude stabilization may be accomplished by spinning the spacecraft and by mounting the sensors or antennas on a despun platform. Alternatively, the spacecraft may be stabilized in three axes. Three-axis stabilization may be accomplished by a control system using fuel-burning thrusters, but the use of such thrusters requires the expenditure of fuel, which tends to limit the service life of the spacecraft. Another method of three-axis stabilization uses reaction wheels or momentum wheels mounted within the spacecraft. The reaction wheels are torqued under the control of an attitude control system to cause the spacecraft body to assume the desired attitude. The energy for torquing the wheels is electrical, and is derived from solar panels. Attitude control by the use of wheels therefore generally provides longer operating lifetime than simple attitude control by the use of thrusters.

In order to maintain a face of the satellite directed toward the Earth, the satellite must rotate about its pitch axis at the orbit rate. When using reaction wheel control, the wheel or wheels are torqued to maintain an earth-oriented attitude. Environmental disturbance torques that act on the spacecraft tend to result in a gradual increase in the wheel momenta. In order to prevent the wheels from reaching their mechanical momentum limits, and to thereby maintain the ability to provide reaction wheel based attitude control, the wheel momentum must be periodically reduced. Wheel momentum may be reduced by the use of fuel-consuming thrusters which torque the spacecraft body in a manner which opposes the wheel momentum. However, the use of such thrusters is subject to the same objection of limited lifetime described above.

Figure 1A:
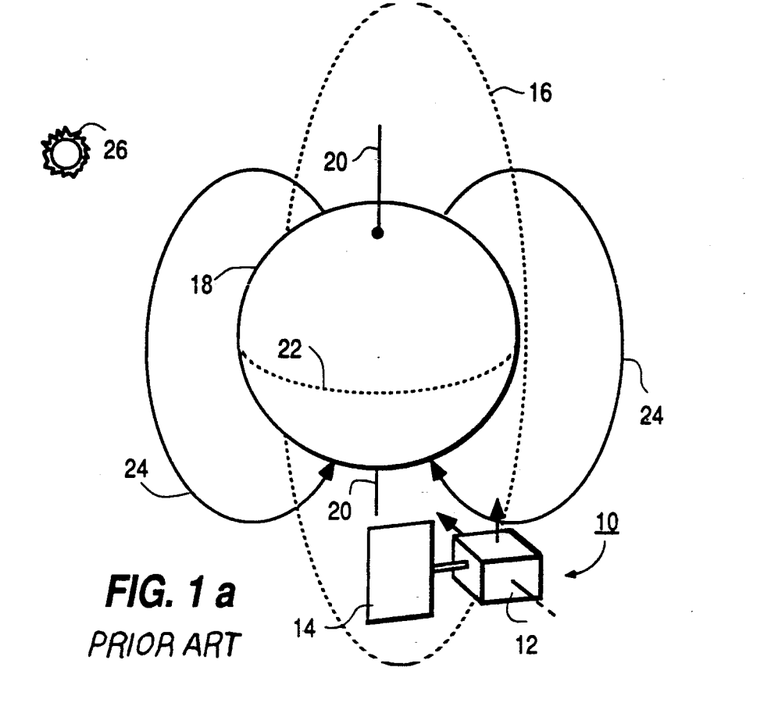
FIG. 1a is a perspective or isometric view of an asymmetric satellite in a polar orbit around the Earth, with its solar panel pointed toward the Sun.

FIG. 1a illustrates a spacecraft designated generally as 10, and including a body 12 and a solar panel 14. Spacecraft 10 is following an orbit illustrated by dashed-line path 16 about the Earth 18. The Earth's rotational axis is illustrated as 20, and the Equator is illustrated by dash-line 22. Lines of magnetic force associated with the Earth's magnetic field are illustrated as 24. As illustrated in FIG. 1, solar panel 14 is directed toward the sun 26, and is controlled to continue facing the sun at all orbital positions of satellite 10.

Figure 1B:
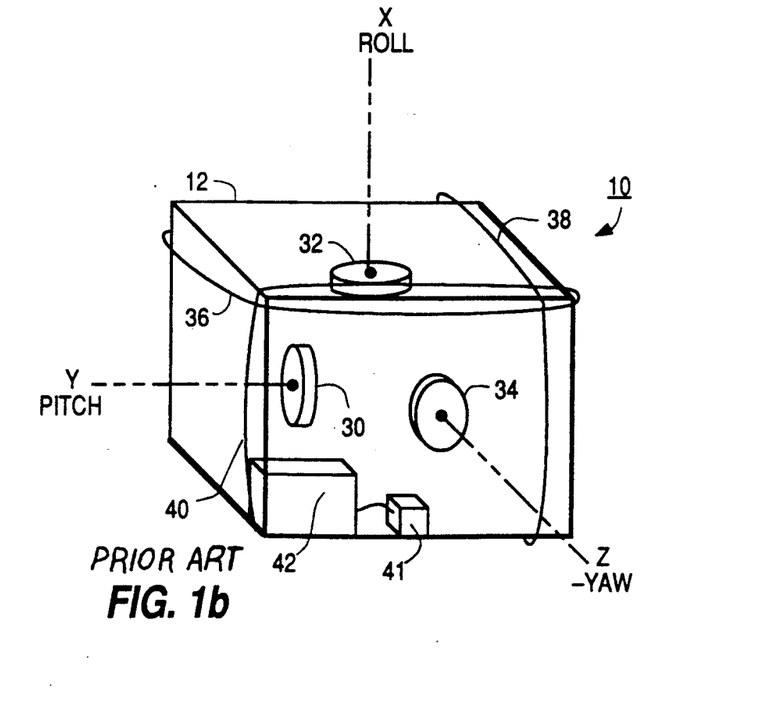
FIG. 1b illustrates the orientation of reaction or momentum wheels and magnetic torquing coils in the spacecraft of FIG. 1b, FIGS. 1a and 1b are referred to jointly as FIG. 1.

FIG. 1b illustrates details of spacecraft 10. In FIG. 1b a first reaction wheel 30 is oriented with its axis along the pitch or y axis, a second reaction wheel 32 is oriented with its axis along the x or roll axis, and a third reaction wheel 34 is oriented with its axis along the yaw or z axis. Also in FIG. 1b, magnetic torquer windings illustrated as 36, 38 and 40 are wound about the spacecraft body. Further in FIG. 1b, a set of three-axis magnetometers is illustrated as a block 41, and is connected to a torquer control arrangement illustrated as a block 42

Figure 2:
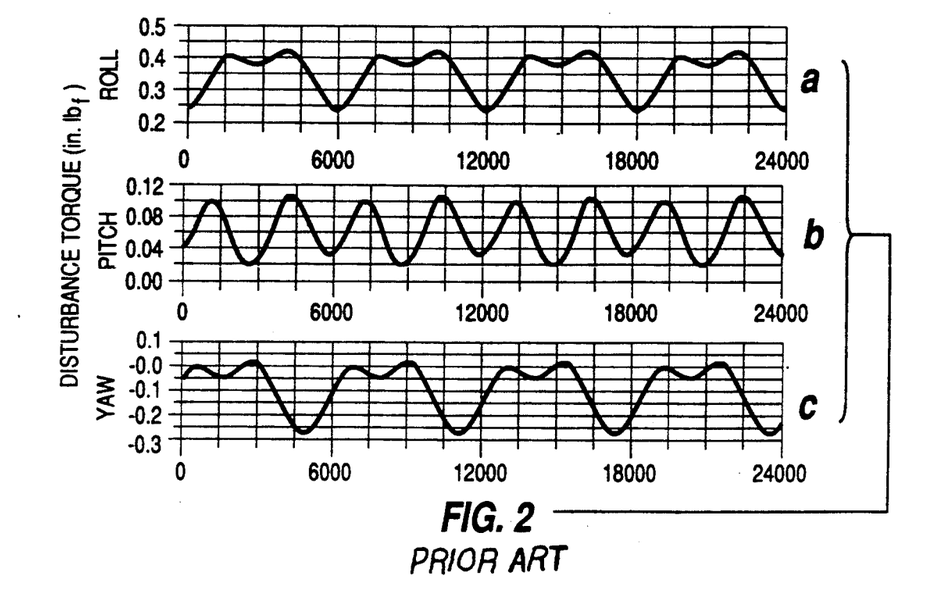
FIGS. 2a, 2b and 2c, referred to jointly as FIG. 2, are plots versus time of environmental disturbance torques about roll, pitch and yaw axes, respectively.

FIGS. 2a, 2b and 2c illustrate as time functions the roll, pitch and yaw disturbance torques, respectively, measured in inch-lb. In FIG. 2, the disturbance torques include a periodic component and an offset component. The disturbance torques arise from atmospheric drag, gravity gradient effects, and solar pressure. The cyclical perturbations recur at roughly 6,000 second intervals, corresponding to the orbital period. The constant offset of the disturbance torques is attributable to the asymmetric orientation of solar panel 14 of FIG. 1a. In FIG. 2, zero seconds and each 6,000 second increment thereafter represent the times at which the spacecraft crosses the Earth's Equator, known as the ascending node.

Figure 3:
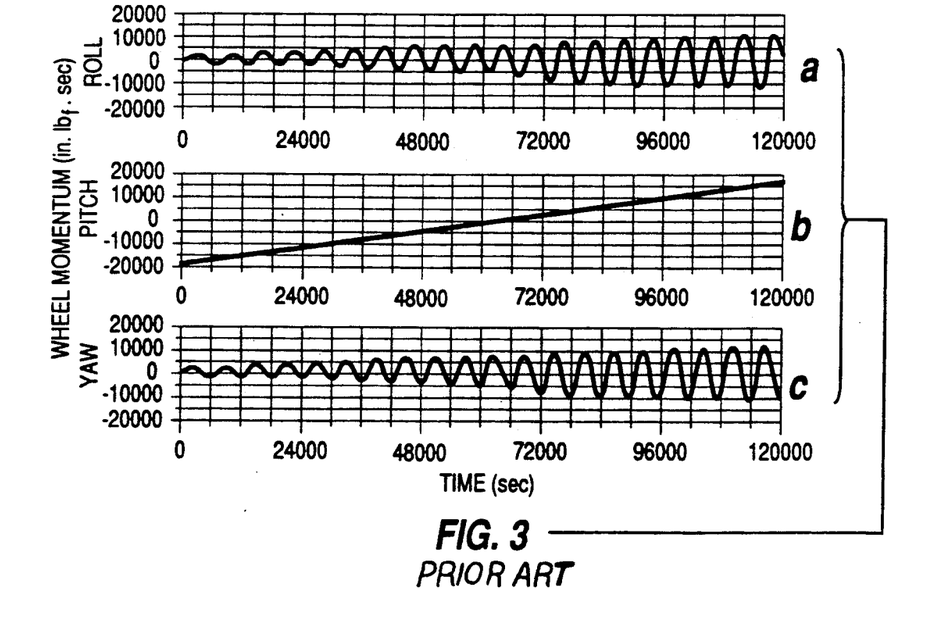
FIGS. 3a, 3b and 3c, referred to jointly as FIG. 3, are plots versus time of wheel momentum about roll, pitch and yaw axes, respectively, without momentum unloading control.

FIGS. 3a, 3b and 3c represent as time functions the roll, pitch and yaw wheel momentum, respectively, in the absence of unloading. The changes in wheel momentum with time are attributable to the disturbance torques illustrated in FIG. 2. Some components of the disturbance torques of FIG. 2 contribute to the cyclical variations of wheel momentum in FIG. 3, while others result in secular or continually increasing or decreasing components. For example, in FIG. 3a, the peak values of the cyclical component of wheel momentum increases with increasing time. At some point, therefore, such a continuing increase in amplitude will result in reaching the wheel momentum limit. Similarly, the pitch wheel momentum of FIG. 3b increases monotonically with increasing time. In order to maintain continuous attitude control, the secular component of the wheel momentum must be unloaded.

Figure 4:
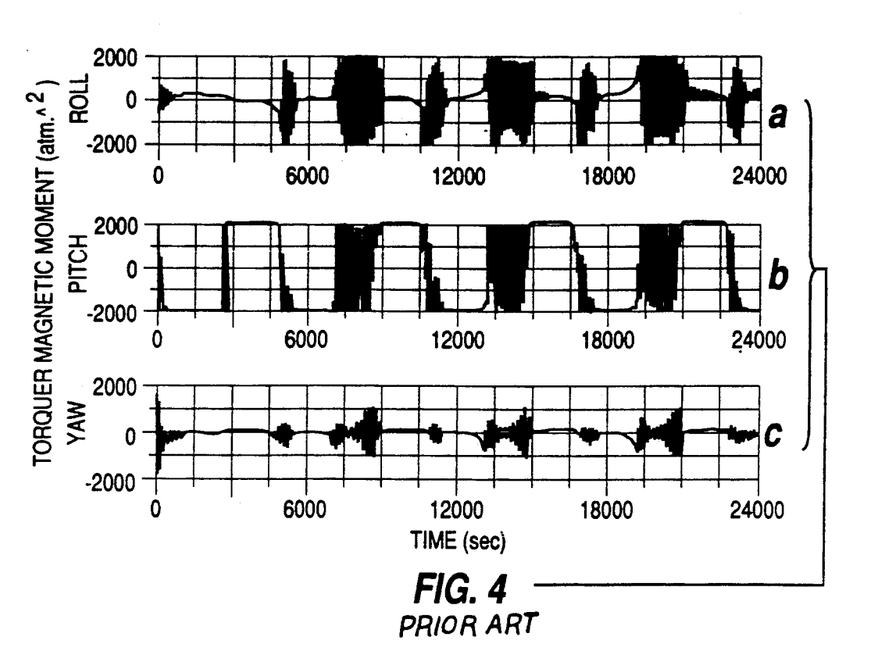
FIGS. 4a, 4b and 4c, referred to jointly as FIG. 4, are plots versus time of magnetic moments produced about roll, pitch and yaw axes, respectively, by spacecraft torquers using a prior-art control system.

FIGS. 4a, 4b and 4c represent the roll, pitch and yaw torquer magnetic moment measured in ampere-turns-meter$^2$ (ATM$^2$) for a spacecraft using a prior art torquer control system which pulse width or continuously modulates the torquer current. The prior art control system measures the Earth's geomagnetic field B and the net momentum of the reaction wheel, and forms a vector cross product HXB. The normalized HXB vector is multiplied by the maximum magnetic moment which can be achieved along each of the roll, pitch and yaw axes to determine the torquer dipole command. In FIGS. 4a, 4b and 4c, large excursions or jitter in the roll and pitch moments, and lesser excursions in the yaw moments, occur at about 7500 seconds, 14,000 seconds, and 20,000 seconds, corresponding to passage of the spacecraft across the Earth's magnetic poles. The jitter illustrated in FIG. 4 arises because the magnitude of the Earth's geomagnetic field near the poles is large, but the cyclical component of the wheel momentum results in relatively low wheel momentum. Operation of the magnetic torquers in regions near the poles, therefore, produces a high magnitude of wheel momentum change at times when the wheel momentum is low, which tends to drive the torquer command from one extreme to the other. This in turn results in the illustrated jitter, which disturbs the spacecraft attitude. Such disturbances are undesirable.

SUMMARY OF THE INVENTION

A method for maintaining the attitude of the satellite includes the step of measuring the direction of the ambient magnetic field in the vicinity of the satellite. The magnitude and direction of the net wheel momentum of the satellite is also determined, and the angle therebetween is determined. The angle is compared with a predetermined value, and magnetic torquers are energized only when the angle exceeds a predetermined value. In a particular embodiment of the invention, the magnitude of the ambient magnetic field is also measured.

DESCRIPTION OF THE DRAWING

FIG. 9b illustrates various angles associated with the flow chart of FIG. 9a;

DESCRIPTION OF THE INVENTION

FIG. 1a illustrates a spacecraft designated generally as 10, and including a body 12 and a solar panel 14. Spacecraft 10 is following an orbit illustrated by dashed-line path 16 about the Earth 18. The Earth's rotational axis is illustrated as 20, and the Equator is illustrated by dash-line 22. Lines of magnetic force associated with the Earth's magnetic field are illustrated as 24. As illustrated in FIG. 1, solar panel 14 is directed toward the sun 26, and is controlled to continue facing the sun at all orbital positions of satellite 10.

FIG. 1b illustrates details of spacecraft 10. In FIG. 1b a first reaction wheel 30 is oriented with its axis along the pitch or y axis, a second reaction wheel 32 is oriented with its axis along the x or roll axis, and a third reaction wheel 34 is oriented with its axis along the yaw or z axis. Also in FIG. 1b, magnetic torquer windings illustrated as 36, 38 and 40 are wound about the spacecraft body. Further in FIG. 1b, a set of three-axis magnetometers is illustrated as a block 41, and is connected to a torquer control arrangement illustrated as a block 42

FIGS. 2a, 2b and 2c illustrate as time functions the roll, pitch and yaw disturbance torques, respectively, measured in inch-lb. In FIG. 2, the disturbance torques include a periodic component and an offset component. The disturbance torques arise from atmospheric drag, gravity gradient effects, and solar pressure. The cyclical perturbations recur at roughly 6,000 second intervals, corresponding to the orbital period. The constant offset of the disturbance torques is attributable to the asymmetric orientation of solar panel 14 of FIG. 1a. In FIG. 2, zero seconds and each 6,000 second increment thereafter represent the times at which the spacecraft crosses the Earth's Equator, known as the ascending node.

FIGS. 3a, 3b and 3c represent as time functions the roll, pitch and yaw wheel momentum, respectively, in the absence of unloading. The changes in wheel momentum with time are attributable to the disturbance torques illustrated in FIG. 2. Some components of the disturbance torques of FIG. 2 contribute to the cyclical variations of wheel momentum in FIG. 3, while others result in secular or continually increasing or decreasing components. For example, in FIG. 3a, the peak values of the cyclical component of wheel momentum increases with increasing time. At some point, therefore, such a continuing increase in amplitude will result in reaching the wheel momentum limit. Similarly, the pitch wheel momentum of FIG. 3b increases monotonically with increasing time. In order to maintain continuous attitude control, the secular component of the wheel momentum must be unloaded.

FIGS. 4a, 4b and 4c represent the roll, pitch and yaw torquer magnetic moment measured in ampere-turns-meter$^2$ (ATM$^2$) for a spacecraft using a prior art torquer control system which pulse width or continuously modulates the torquer current. The prior art control system measures the Earth's geomagnetic field B and the net momentum of the reaction wheel, and forms a vector cross product HXB. The normalized HXB vector is multiplied by the maximum magnetic moment which can be achieved along each of the roll, pitch and yaw axes to determine the torquer dipole command. In FIGS. 4a, 4b and 4c, large excursions or jitter in the roll and pitch moments, and lesser excursions in the yaw moments, occur at about 7500 seconds, 14,000 seconds, and 20,000 seconds, corresponding to passage of the spacecraft across the Earth's magnetic poles.

Figure 5:
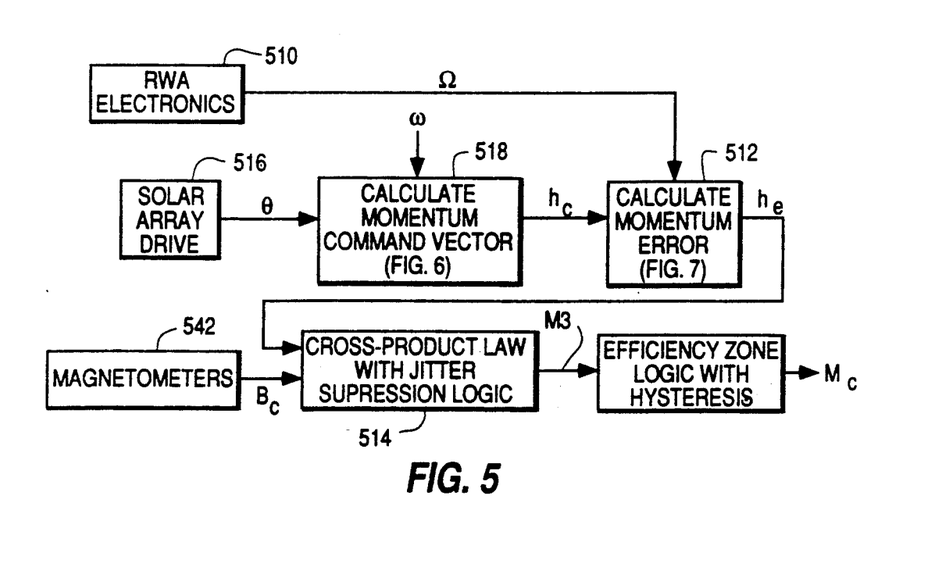
FIG. 5 is a simplified block diagram of a control system according to the invention.

FIG. 5 is a simplified block diagram of a control system according to the invention. In FIG. 5, reaction wheel electronics 510 measure reaction wheel speeds $\Omega$. The $\Omega$ signals are coupled to a block 512. A solar array drive is illustrated as a block 516, and the angle $\theta$ of the solar array is coupled to a further block 518 which represents calculation of a momentum command vector $h_c$. The momentum command vector is applied to block 512, together with wheel speeds $\Omega$. Block 512 calculates momentum error $h_e$. The momentum error $h_e$ calculated in block 512 is applied to an input of a block 514. A set of magnetometers for measuring three-axis geomagnetic field B is illustrated as a block 542. Block 542 is coupled to a further input of block 514.

Block 514 represents jitter suppression and calculation of a cross-product to produce a gain-controlled torquer magnetic moment command. The command is applied to a further block 520, which represents efficiency zone and hysteresis logic.

Figure 6:
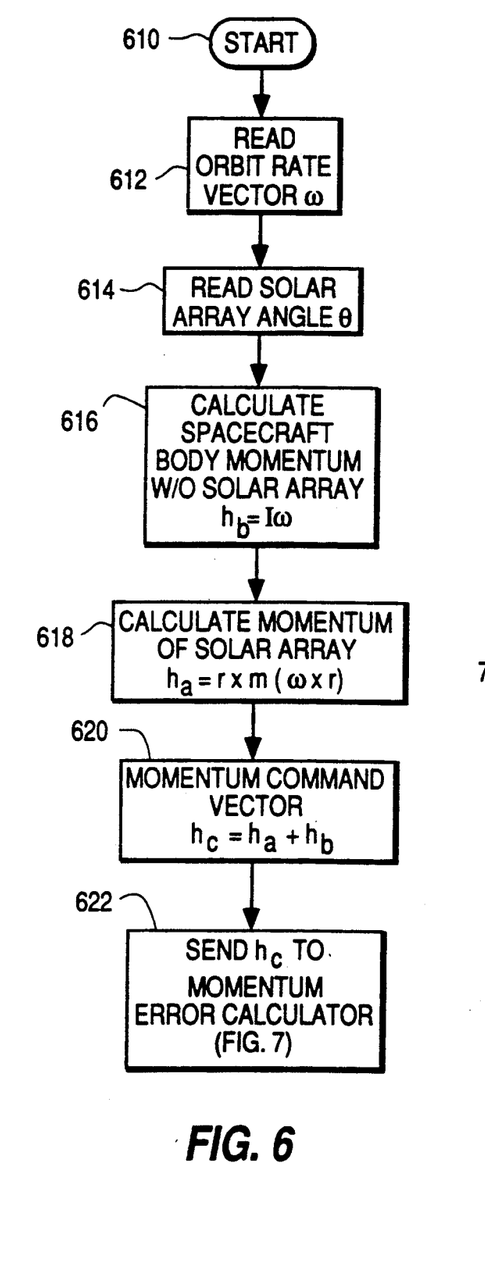
FIGS. 6, 7, 8 and 9a are simplified flow charts illustrating control details of the control system of FIG. 5.

FIG. 6 is a simplified flow chart illustrating the calculation of momentum command vector $h_c$ in block 518 of FIG. 5. In FIG. 6, the logic flow begins at a START block 610 and continues to a block 612, which represents reading of the orbit rate vector $\omega$. The orbit rate is known from orbit dimensions, and may be preprogrammed into a satellite or provided by an uplink from an Earth station. Block 614 represents the reading of the solar array angle $\theta$. Block 616 represents calculation of the spacecraft body momentum $h_b$, which is the momentum of the spacecraft body, excluding the solar array. The calculation is performed as a product, where I represents the inertia matrix of the spacecraft body $$h_b = I\omega \qquad (1)$$

Block 618 represents the calculation of the momentum $h_a$ of the solar array according to the equation $$h_a = rXm((\omega Xr) + \dot{r}) \qquad (2)$$

where
r is the position vector from the spacecraft center of mass to the solar array center of mass;
x is the vector cross product;
m is the mass of the solar array; and
$\dot{r}$ is the time derivative of r, and both r and $\dot{r}$ may be functions of $\theta$.

Block 620 represents the calculation of momentum command vector $h_c$ by summing $$h_c = h_a + h_b \qquad (3)$$

Finally, block 622 represents the storage of momentum command vector $h_c$ in order to make it available for further calculation.

Figure 7:
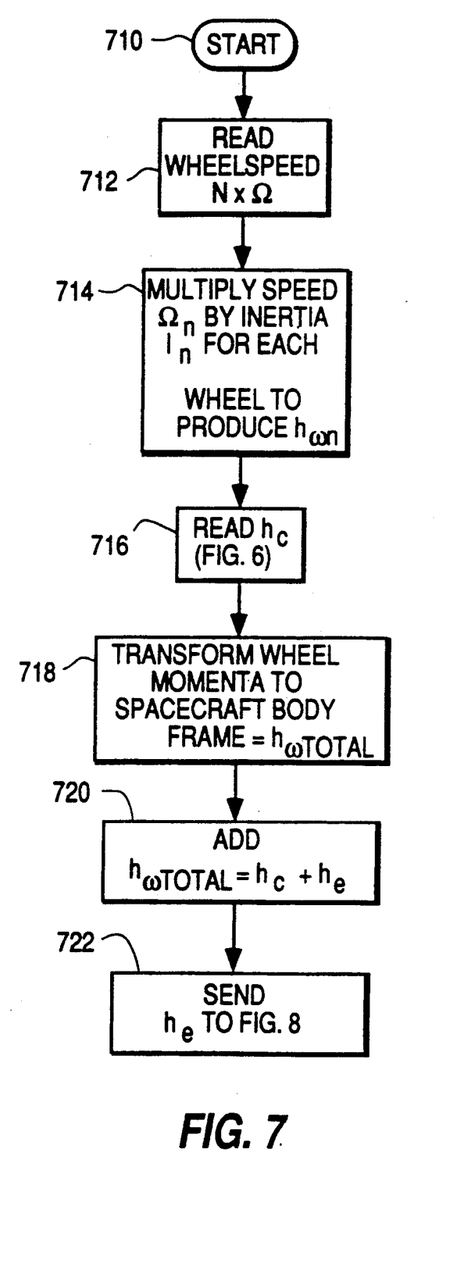

FIG. 7 represents the calculation of momentum error $h_e$ in block 512 of FIG. 5. In FIG. 7, the logic begins with a START block 710, and proceeds to a block 712 which reads the value of $\Omega$ for each of the N wheels of the reaction wheel assembly. The logic proceeds to a block 714, which represents the calculation of momentum for each of the wheels by multiplying the speed $\omega_n$ of each wheel by the inertia $I_n$ for the corresponding wheel, to produce $h_{\omega n}$ $$h_{\omega n} = I_n \omega_n \qquad (4)$$

Block 716 represents the fetching or reading of momentum command vector $h_c$ from block 622 of FIG. 6. Block 718 represents the transformation of the momenta of the n reaction wheels to the spacecraft body frame. The transformation matrix is based upon the geometry of the various wheel axes, and may be stored as data in the spacecraft or transmitted to the spacecraft from an earth station. The transformed wheel momenta $h_{\omega TOTAL}$ is added to the momentum command vector $h_c$ to produce the desired momentum error $h_e$ in block 720:

$$h_e = h_c + h_{\omega TOTAL} \qquad (5)$$

Block 722 represents the storage of the calculated Value of $h_e$ to make it available for further calculations.

Figure 8:
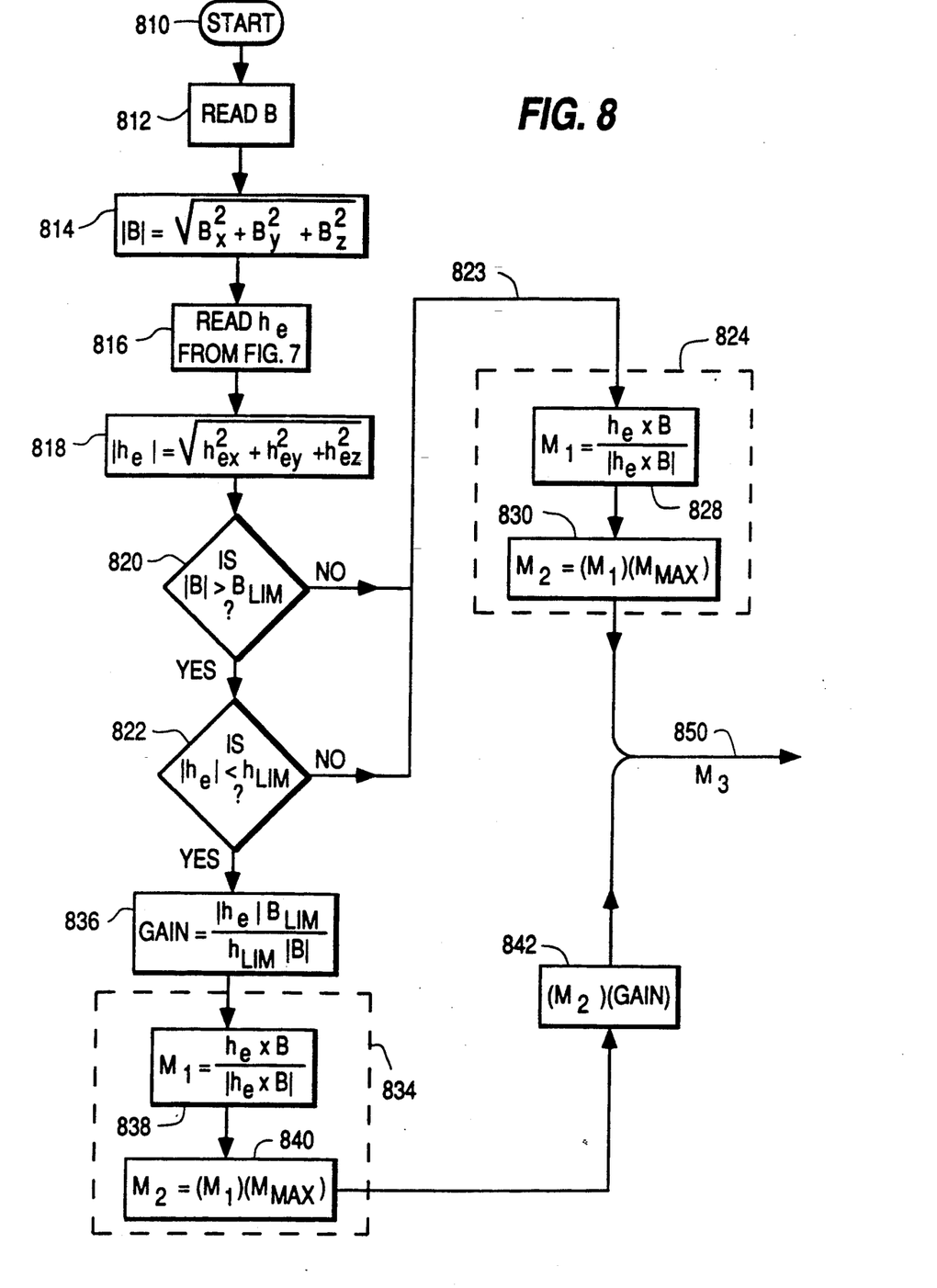

FIG. 8 is a simplified block diagram representing the calculations performed in block 514 of FIG. 5. In FIG. 8, the logic begins at a START block 810, and proceeds to a block 812, which represents the reading of B, which is a vector representing the local geomagnetic fields. The logic proceeds to a block 814, which represents the calculation of the magnitude of vector B by taking the square root of the sum of the squares of the components along the X, Y and Z axes $$|B| = \sqrt{B_x^2 + B_y^2 + B_z^2} \qquad (6)$$

Block 816 represents the reading of momentum error $h_e$ from FIG. 7. Block 818 represents the calculation of $|h_e|$ by taking the square root of the sum of the squares of the components along the X, Y and Z axes $$|h_e| = \sqrt{h_{ex}^2 + h_{ey}^2 + h_{ez}^2} \qquad (7)$$

The logic then arrives at a decision block 820, in Which the magnitude of B from block 814 is compared with a limit value of $B_{lim}$. If the absolute magnitude of the geomagnetic fields $|B|$ is less than the limit value $B_{lim}$, the logic exits block 820 by the NO path and proceeds to a plurality of logic blocks illustrated together as 824. If $|B|$ is greater than $B_{lim}$, the logic flows from decision block 820 by the YES block to a further decision block 822. Block 822 represents the comparison of $|h_e|$ with a limiting value $h_{lim}$. If $|h_e|$ is greater than $h_{lim}$, the logic leaves decision block 822 by the NO path and flows to the logic represented by block 824. Thus, so long as the absolute value of the geomagnetic field is less than the limiting value, which might be the case far from the Earth's magnetic poles, or if the absolute value of momentum error $h_e$ is greater than a limiting value, the logic flows by path 823 to the logic within block 824. Within block 824 the logic flows to a further block 828 which represents calculation of an intermediate momentum value $M_1$ as the quotient of vector cross products $$M_1 = h_e XB / |h_e XB| \qquad (8)$$

Logic block 830 calculates a further momentum product designated $M_2$ $$M_2 = (M_1)(M_{max}) \qquad (9)$$

and this value of momentum is made available as $M_3$ on a logic path 850 for further calculations.

As mentioned, the magnitude of the geomagnetic or B fields near the poles is liable to be large while the magnitude of the net momentum is small. Under this condition, the logic flow through decision blocks 820 and 822 of FIG. 8 will result in a logic flow from the YES output of decision block 822 to a block 836. Block 836 represents the calculation of a system gain according to the Equation $$Gain = |h_e| B_{lim} / h_{lim} |B| \qquad (10)$$

The logic flows from block 836 to further logic contained within dotted lines 834. Logic blocks 838 and 840 contained within logic block 834 are identical to logic blocks 828 and 830 contained within logic block 824. Product $M_2$ produced at the output of logic block 840 is applied to a further logic block 842, which multiplies $M_2$ by the gain calculated in block 836. The output of logic block 842 is coupled as $M_3$ onto logic path 850. The values of $M_3$ appearing on logic path 850 are alternatives which depend upon conditions. If the magnitude of the environmental magnetic field is small, or if the momentum error is large, $M_3$ has a value established by the processing of block 824, whereas if the momentum error is small and the magnetic field is large, the value is additionally multiplied by a gain function which is calculated in block 836.

As so far described, the control system measures the magnitudes of the environmental magnetic field and the magnitude of the momentum error $h_e$ for controlling system gain. This prevents the jitter illustrated in FIG. 4, and provides improved pointing accuracy.

Figure 9A:
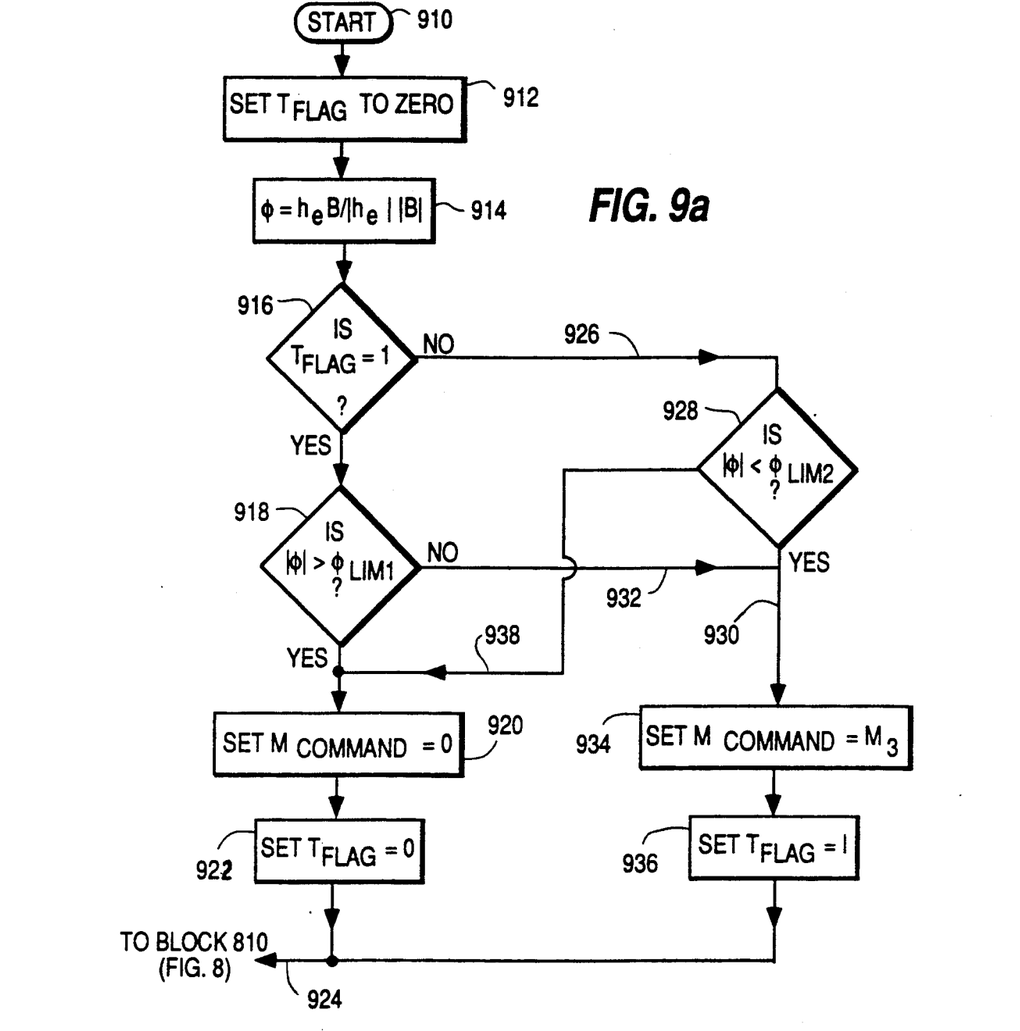
Figure 9B:
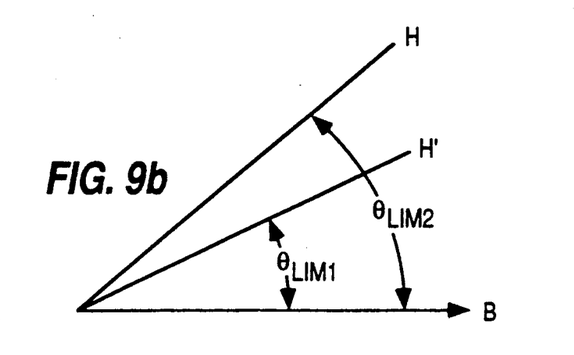
Figure 10:
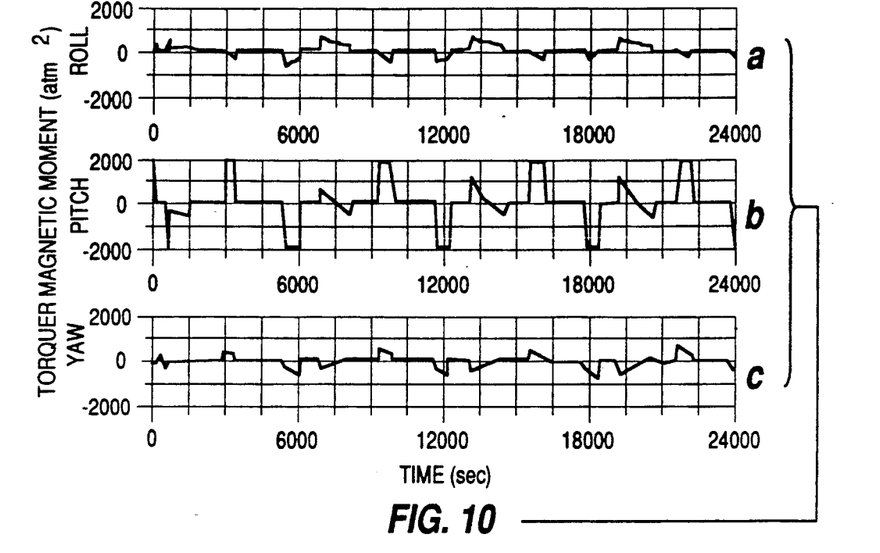
FIGS. 10a, 10b and 10c, referred to jointly as FIG. 10, are plots versus time of magnetic moments produced about roll, pitch and yaw axes, respectively, by spacecraft torquers using a control system according to the invention.
Figure 11:
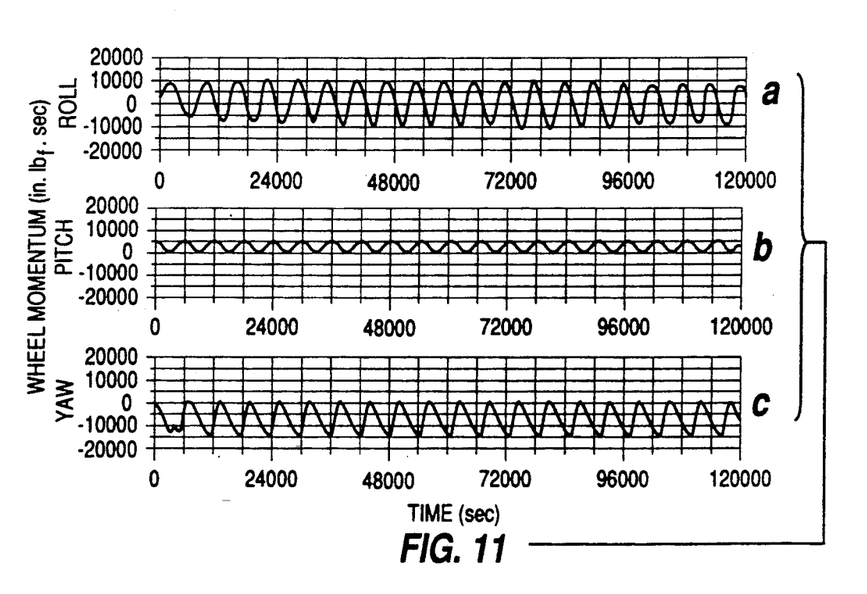
FIGS. 11a, 11b and 11c, referred to jointly as FIG. 11, are plots versus time of wheel momentum about roll, pitch and yaw axes, respectively, using momentum control according to the invention.

FIG. 9 is a simplified flow chart of processing according to the invention. The arrangement of FIG. 9a implements a hysteresis control which eliminates rapid cycling at the transition between torquing and non-torquing regions. Referring to FIG. 9b, a momentum direction H' makes an angle of $\theta_{LIM1}$ with the measured environmental magnetic field B. The magnitude of angle $\theta_{LIM1}$ is selected so that the magnetic torquing is sufficiently effective or efficient. A suitable angle might be 45 degrees. If torquing were simply proscribed for angles less than $\theta_{LIM1}$ and permitted for angles greater than or equal to $\theta_{LIM1}$, noise and/or measurement errors might cause repeated ON-OFF cycling of the torquers when the angle between $h_e$ and B is near $\theta_{LIM1}$. This cycling is avoided by including a "dead zone" in the control. In FIG. 9b, the "dead zone" is the region between $\theta_{LIM1}$ and $\theta_{LIM2}$. The torquers are not actuated when the angle lies between $\theta_{LIM1}$ and $\theta_{LIM2}$.

The logic of FIG. 9a performs the operation described in conjunction with FIG. 9b, but for simplicity and computational convenience, the processing is performed in terms of parameters $\phi = \cos\theta$, $\phi_{LIM1} = \cos\theta_{LIM1}$, and $\phi_{LIM2} = \cos\theta_{LIM2}$. In FIG. 9b, the logic begins at a START block 910 and flows to a block 912, which represents setting of a flag $T_{FLAG}$ to a value of zero. $T_{FLAG}$ may assume logic values of zero or one, with logic zero indicating that the magnetic torquers were not ON during the previous iteration, and logic one indicating that they were previously ON. The logic flows through blocks 910 and 912 only during initial start-up. The logic flows from block 912 to a block 914, representing the calculation of $\phi$ as a quotient of products $$\phi = Bh_e / |h_e| \cdot |B| \qquad (11)$$

From block 914, the logic flows to a decision block 916, in which the condition of $T_{FLAG}$ is examined. If $T_{FLAG}$ has a value of one (the torquers were previously ON), the logic exits from decision block 916 by the YES output, and flows to a further decision block 918. Decision block 918 compares the absolute value of $\phi$ with $\phi_{LIM1}$. If $|\phi|$ is greater than $\phi_{LIM1}$, the logic exits from decision block 918 by the YES output. This corresponds to a condition in which $\theta \leq \theta_{LIM1}$ in FIG. 9b. From the YES output of decision block 918, the logic flows to block 920, representing the setting of $M_{COMMAND}$ to zero, which corresponds to a no-torquing command. The state of $T_{FLAG}$ is set to zero in block 922, and the logic returns by a path 924 to block 810 of FIG. 8 in preparation for another iteration.

If the torquers were previously ON, as described above, and $\phi$ is less than, or equal to $\phi_{LIM1}$ ($\theta > \theta_{LIM1}$ in FIG. 9b), the logic leaves decision block 918 of FIG. 9a by the NO output, and flows to a block 934, representing the setting of $M_{COMMAND}$ to equal $M_3$. This causes the torquers to operate at a magnitude established by $M_3$, where the magnitude may be accomplished by an appropriate percentage of pulse width modulation. $T_{FLAG}$ is set to a logic one in block 936, and the logic returns by path 924 to block 810 for another iteration.

If the torquers were previously OFF the logic flow of FIG. 9a leaves decision block 916 by the NO output, and flows by a path 926 to a decision block 928. Decision block 928 compares the absolute value of $\phi$ with $\phi_{LIM2}$. If $|\phi| < \phi_{LIM2}$ (corresponding to $|\theta| > \theta_{LIM2}$ in FIG. 9b) the logic leaves decision block 928 by the YES output, and flows by a logic path 930 to block 934, representing the setting of $M_{COMMAND}$ to equal the value of $M_3$. This results in torquing of the spacecraft. The logic then flows to block 936, representing setting of $T_{FLAG}$ to the ONE state. The logic returns by logic path 924 to block 810 to begin another iteration.

If the torquers were previously OFF as mentioned above, the logic reaches decision block 928 of FIG. 9a. If $|\phi| \geq \phi_{LIM2}$ (corresponding to $\theta \leq \theta_{LIM2}$ in FIG. 9b), the logic leaves decision block 928 by the NO output, and proceeds by a logic path 938 to pass in sequence through blocks 920 and 922, representing no torquing and the setting $T_{FLAG} = 0$, respectively, following which another iteration begins.

The dead zone operates in the following manner. If $\theta$ lies between $\theta_{LIM1}$ and $\theta_{LIM2}$, $\theta$ is greater than $\theta LIM1$ and less than $\theta_{LIM2}$, corresponding to $\phi < \phi_{LIM1}$ and $\phi > \phi_{LIM2}$. The logic must flow through either decision block 918 or 928 in order to reach the torquing control condition, represented by blocks 934 and 936. When the logic flows through decision block 916 and $\phi < \phi_{LIM1}$, the logic always exits by the NO path, thereby flowing to blocks 934 and 936. When the logic flows through decision block 928, with $\phi > \phi_{LIM2}$, it always exits by the NO path to blocks 920 and 922. Since one path represents torquing and the other path represents no torquing, a dead zone exists.

Other embodiments of the invention will be apparent to those skilled in the art. For example, the reaction or momentum wheels may exceed three in number, and may be in arbitrary orientations. The magnetic torquers may have any arbitrary orientation relative to the spacecraft body, and may exceed three in number. Also, the magnetic torquers may have different sizes and/or different magnetic moments. While the satellite orbit has been described as a polar orbit, the advantages of the system may be realized for other orbits.

In addition, the torquing logic of FIG. 9a can be implemented by weighting the commanded dipole, $M_3$, by a factor, $\Gamma$, calculated as $\Gamma = 1 - |\phi|$ where $\phi$ is calculated as in block 914.

What is claimed is:

1. A method for maintaining satellite attitude, comprising the steps of:
    measuring the direction of the ambient magnetic field in the vicinity of said satellite;
    determining the direction of the net wheel momentum of said satellite;
    determining the angle between said direction of said magnetic field and said direction of said momentum;
    comparing said angle with a predetermined value; and
    energizing magnetic torquers for torquing said satellite for reducing said wheel momentum only when said angle exceeds said predetermined value.

2. A method according to claim 1 further comprising the step of measuring the magnitude of said ambient magnetic field; and in said step of energizing magnetic torquers, performing the further step of controlling the magnitude of the energization in response to said magnitude of said ambient magnetic field.

3. A method for maintaining satellite attitude, comprising the steps of:

measuring the direction of the ambient magnetic field in the vicinity of said satellite;

determining the absolute magnitude of said ambient magnetic field;

determining the direction of the net wheel momentum of said satellite;

determining the angle between said direction of said magnetic field and said direction of said net wheel momentum;

comparing said angle with a predetermined value;

establishing the magnitude by which magnetic torquers are to be energized in response to said magnitude of said ambient magnetic field, by the further steps of: (a) determining the absolute magnitude of the sum of the spacecraft body, ancillary panel and wheel momenta to generate a momentum error magnitude; (b) comparing said absolute magnitude of said ambient magnetic field with a limiting value of said field; (c) comparing said momentum error magnitude with a limiting momentum magnitude; and (d) multiplying said magnitude of said energization by a multiplier other than unity only when said absolute magnitude of said ambient magnetic field exceeds said limiting value of said field and said momentum error magnitude is less than said limiting momentum value; and energizing said magnetic torquers for torquing said satellite for reducing said wheel momentum only when said angle exceeds said predetermined value.

4. A method according to claim 3 further comprising the step of:

at least when said absolute value of said ambient magnetic field is less than said limiting value of said field and said momentum error magnitude is greater than said limiting momentum value, multiplying said magnitude of said energization by a value of unity.

5. A method for maintaining satellite attitude, comprising the steps of:

measuring the direction of the ambient magnetic field in the vicinity of said satellite;

determining the direction of the net wheel momentum of said satellite;

determining the angle between said direct of said magnetic field and said direction of said momentum; and torquing to reduce wheel momentum in proportion to the magnitude of said angle.

* * * * *